May 24, 1927.

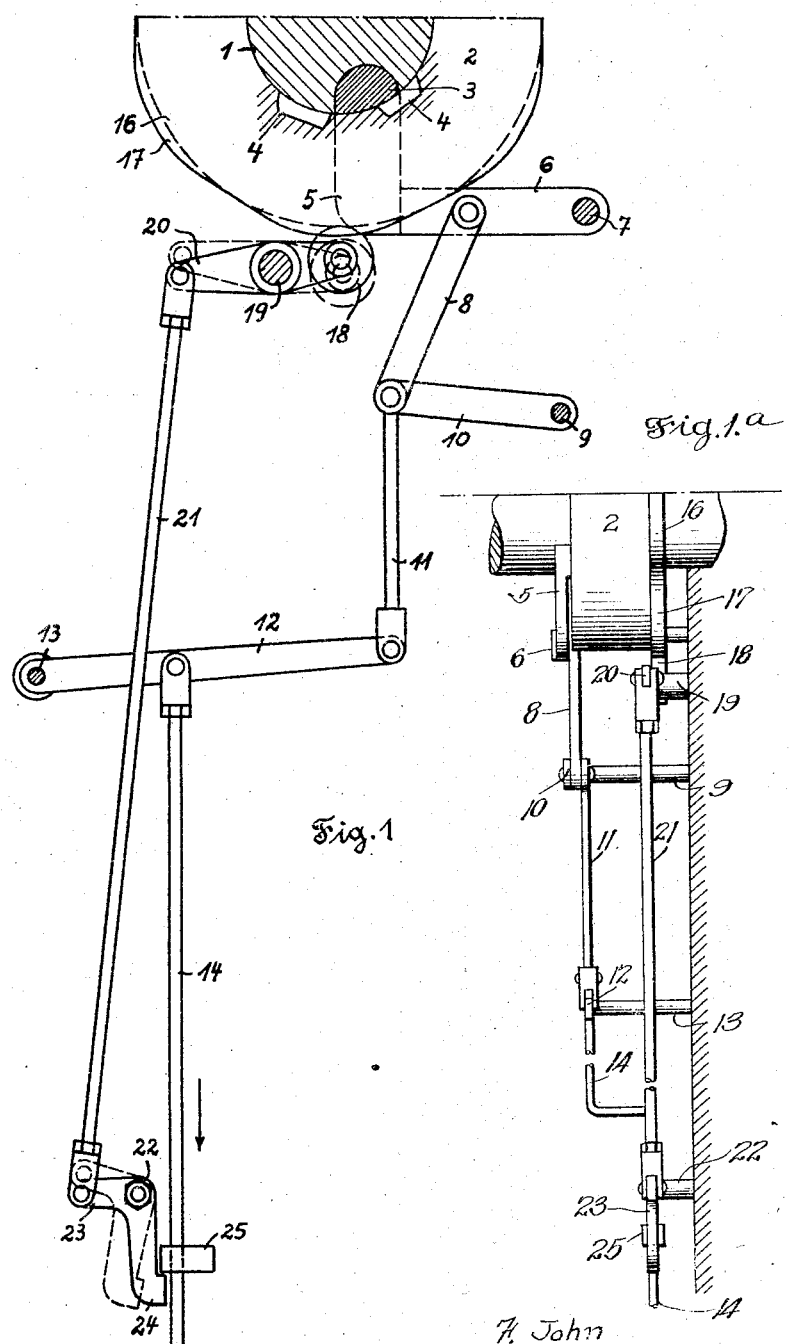

F. JOHN 1,630,183

ROTARY KEY CLUTCH

Filed Dec. 21. 1926

2 Sheets-Sheet 2

F. John
INVENTOR

Patented May 24, 1927.

1,630,183

UNITED STATES PATENT OFFICE.

FERDINAND JOHN, OF DUSSELDORF-OBER-KASSEL, GERMANY.

ROTARY-KEY CLUTCH.

Application filed December 21, 1926, Serial No. 156,223, and in Germany December 19, 1925.

In rotary key clutches, as is known, when the clutch is being closed, the rotary key sometimes does not spring fully into the recess in the rotating driving wheel, but only strikes with its edge against the edge of the notch. The result is then that the clutch either does not close at all and therefore the shaft, and the machine driven thereby, an eccentric press for example, is not driven with it, or else that the driving only just takes place. In either case there is a great deal of wear. If such improper coupling operations occur repeatedly, the aforementioned edges become considerably rounded off and deformations are produced in consequence of the impact action.

A further disadvantage arises in the following manner. With the rotary key there is as a rule connected a special locking element of some kind, which in its turn may be constructed as a rotary key, a locking pawl or the like, and which is frequently controlled by the rotary key itself in such a way that it can only enter its locking position when the rotary key has passed into its coupling position. In the case of the defective methods of coupling mentioned above, this locking element frequently does not come into action at all or only comes partly into action, so that here again wear takes place, and above all, the improper action occurs of the locking element not being able to serve its proper purpose of preventing the driven shaft from moving ahead of the driving wheel. By this means, however, the workman attending to the machine and also the machine itself are endangered.

According to the present invention the rotary key clutch apparatus is so constructed that the rotary key always enters its recess completely. This result is obtained in consequence of the fact that the rotary key or its engaging lever is subjected to the action of a lock, which is controlled from the rotating member of the clutch, in such a manner that the rotary key can only be moved into engagement when it is in such a position relative to its engaging notch or to one of a number of engaging notches that its engaging movement also results in it springing in completely. This special locking mechanism admits of being controlled in a simple manner, for example by means of a non-circular disc on the revolving clutch member.

Two constructional examples of the invention are illustrated in the accompanying drawings, wherein only those parts which are essential to the comprehension of the novel feature are shown.

Figure 3:
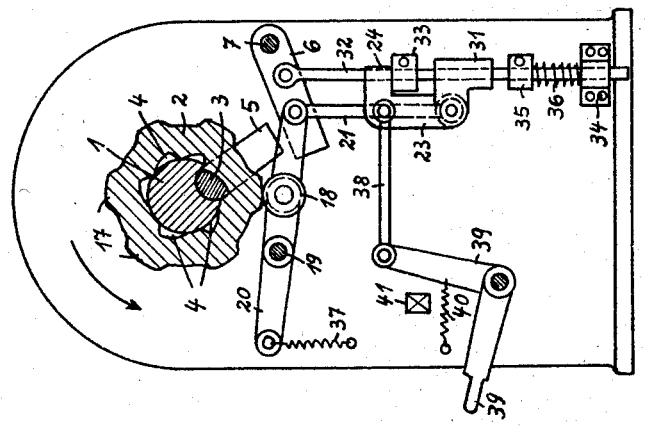
Figure 2:
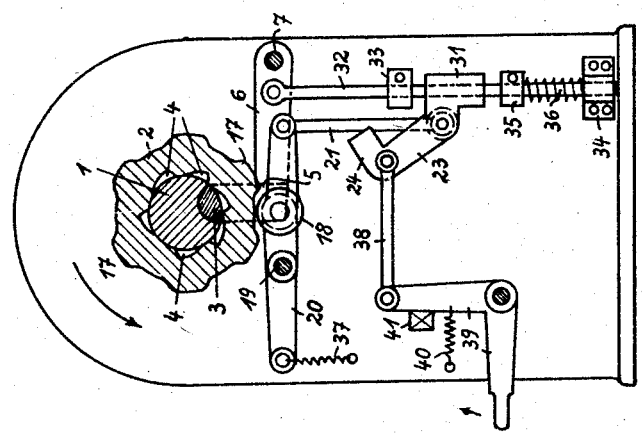

Fig. 1 shows diagrammatically a first constructional form, Fig. 1ª is a front elevation of the arrangement shown in Fig. 1, and Figs. 2 and 3 show similar side elevations, partially in section, of the second constructional form with the parts in different positions.

The shaft 1 in Fig. 1 is driven at times by a continuously rotating sleeve 2, forming the hub of a driving wheel, through the medium of the rotary key 3. A number of recesses 4, of which only two are shown in the drawing, are suitably distributed round the sleeve 2.

The so-called disengaging arm 5 of the rotary key bears when in the position of rest in a known manner against an arm 6, which is fixedly supported at 7, and which is connected with a pulling rod 11 by a pulling member 8, which is upheld by a link 10 pivoted at 9. The pulling rod 11 is attached to a cross arm 12, which is pivoted at 13 and which is connected by a pulling rod 14 with a foot or hand lever, not shown.

To the sleeve 2 is secured a non-circular disc 16, which has as many convexities 17 as there are recesses 4 in the sleeve. Against the non-circular disc there bears a roller 18 on a double lever 20, which is pivoted at 19 and which is connected by a rod 21 with a bell-crank lever 23 pivoted at 22, the free arm of which terminates in a pawl 24. The second position of the bell-crank lever 23, 24 is shown in dotted lines. In the position of rest the pawl engages under a cross-piece 25 on the rod 14 and thereby prevents it from moving downwards. When a cam 17 on the non-circular disc 16 passes the roller 18, the pawl 24 is swung out on each occasion, so that the rod 14 is set free and the rotary key can be pushed in.

If the clutch is to be engaged, the foot or hand lever is actuated in the usual manner by the workman. If the position of the rotary key is not in agreement with its next recess, the bell-crank lever 23, 24 will be in the locking position, and the workman can only effect the engagement thereof when, after the occurrence of the correct relative positions of the rotary key and the notch, the non-circular disc 16, 17 has disengaged the pawl 24, which is positively or operatively dependent upon it.

For the inventive idea explained, the details of the clutch and its members are of course not of fundamental importance. In particular it is a matter of indifference whether a real rotary key is used, as shown in the example illustrated, or any substitute known in the locking pawl art or as a locking bar.

In the case of the arrangement described above, the certainty that the rotary key, and also the locking element which is dependent upon it and which prevents the shaft driven by it from advancing beyond it, can only swing out into the operative position when it can snap fully into its notch, is obtained by employing a catch 24, which is dependent in its action upon the rotating member of the clutch. The hand or foot lever which is actuated by the workman for the purpose of disengaging the rotary key can therefore only come into action when the said catch 24 has released it or the parts to be moved by it of the mechanism that moves the disengaging arm for the rotary key. When the lever to be moved by the workman, which for the sake of simplicity is hereinafter referred to merely as a hand lever, is actuated, when the said catch does not assume the free position, there arises a certain jamming action between the parts, which is then overcome by the operative drive of the mechanism, from the non-circular disc.

This gives rise to friction and the workman if he does not accidentally hit upon the correct time when moving the hand lever, is constrained to keep the hand lever stressed for a short time, until the non-circular disc and the parts moved by it reach the releasing position for the engagement.

This is obviated in the case of the arrangement illustrated in Figs. 2 and 3. In this latter case one clutch member is carried into the operative position solely by a preparatory movement of the hand lever, whereupon the actual closing of the clutch, that is to say, the releasing of the rotary key to enable it to snap into its recess, is brought about by the machine itself. The jamming that is possible with the arrangement shown in Fig. 1 is accordingly here obviated, and the manipulation of the apparatus by the workman is facilitated.

The shaft 1, in Figs. 2 and 3, of a press or the like, is at times driven by the sleeve 2 of a driving fly-wheel or the like, by means of the rotary key 3, for which, in the sleeve 2, six notches 4 are shown, to which there correspond six cams 17 on the sleeve 2, which form the non-circular disc previously mentioned. The locking element which co-operates in a known manner with the rotary key, and which prevents the shaft 1 from running ahead of the sleeve 2, for the sake of simplicity, is not shown but is disclosed in applicant's prior Patent No. 1,371,787.

In the disengaging position shown in Fig. 2, the cross arm 5 of the rotary key 3 bears against the front edge of the disengaging arm 6 pivoted at 7. To the arm 6 is pivoted a rod 32, which rests at its lower end in a sliding support 34, and is held in the locking position by a spring 36 acting against a positioning ring 35.

A double lever 20 pivoted at 19 bears with a roller 18 upon the non-circular disc 17, under the action of a spring 37. The double lever 20, is connected by a connecting rod 21 with a slider 31, slidable upon the rod 32. To the slider 31 is pivoted a bell-crank lever 23, 24, which is connected by a link rod 38 with the hand-lever 39, which is held by a spring 40 against a stop 41. Above the slider 31 a positioning ring 33 is secured to the rod 32.

When the sleeve 2 runs idly, it moves the slider 31 inoperatively up and down six times in each revolution, with the six cams 17, so long as the hand lever 39 occupies the position according to Fig. 2. If, however, the hand lever has passed over into the position according to Fig. 3, the short pawl-like arm 24 of the bell-crank lever 23, 24 passes over the positioning ring 33 of the rod 32 and thereby couples the slider 31 to the positioning ring 33, and with it the rod 32, and thereby, in its turn, the roller lever 18, 20 with the disengaging arm 6 for the rotary key. The next descent of the rod 21 effects, through the parts 31, 24 and 33, the downward movement of the rod 32 against the action of the spring 36, so that the parts pass over into the position shown in Fig. 3, wherein the rotary key is set free and snaps into its notch. The complete snapping in is thus ensured by the agreement of the cams 17 with the notches 4 in a radial direction.

As soon as the roller 18 is set free from its cams 17, all the parts go back into the position according to Fig. 2, owing to the springs 36, 37 and 40.

For the closing of the rotary key clutch, which has to be effected very frequently by the person in charge of a press in the course of the day, it is merely necessary to rock the pawl-like bell-crank lever 23, 24 from left to right, thereby preparing for the connection of the rod members and for the uncoupling of the rotary key, which are effected by the machine itself. If the rocking movement is effected too soon, that is, just when the slider 31 is carried by the roller lever 18, 20 into the bottom position, the end face of the bell-crank lever arm 24 moves against the lateral surface of the positioning ring 33. The workman can then, with a light pressure, keep the parts in such relation to one another until, after a corresponding ascent of the slider 31, the pawl-like member 24 slides over the positioning ring 33.

What I claim is:—

1. A rotary key clutch including a rotatable member, a rotating member, a rotary clutch key associated with said members, a catch, the action of which is dependent upon the rotating member, for keeping the rotary key disengaged, and means for setting free the rotary key for the purpose of closing the clutch at a moment when it is possible for said rotary key to enter correctly into a corresponding recess.

2. A rotary key clutch including a rotatable member, a recessed rotating member, a rotary clutch key associated with said members, means operable for permitting the rotary key to turn in the direction of engagement with a recess in the rotating member for the purpose of closing the clutch, a catch capable of preventing the operation of said means and means for rendering said catch inoperative from time to time when the rotary key is opposite to a recess.

3. A rotary key clutch including a rotatable member, a recessed rotating member, a rotary clutch key associated with said members, means operable for permitting the rotary key to turn in the direction of engagement with a recess in the rotating member for the purpose of closing the clutch, a catch capable of preventing the operation of said means, a cam disc secured to the rotating clutch member, and means co-operating with said cam disc for rendering said catch inoperative from time to time when the rotary key is opposite to a recess.

4. A rotary key clutch including a rotatable member, a recessed rotating member, a rotary clutch key associated with said members, a disengaging arm rigidly connected with the rotary key, an arm normally holding said disengaging arm in such a position that the rotary key cannot move in the direction of a recess in the rotating member, means operable for withdrawing said arm from the disengaging arm, a catch capable of preventing the operation of said means, and means for rendering said catch inoperative from time to time when the rotary key is opposite to a recess.

5. A rotary key clutch including a rotatable member, a recessed rotating member, a rotary clutch key associated with said members, a disengaging arm rigidly connected with the rotary key, an arm normally holding said disengaging arm in such a position that the rotary key cannot move in the direction of a recess in the rotating member, means operable for withdrawing said arm from the disengaging arm, a catch capable of preventing the operation of said means, a cam disc secured to the rotating clutch member, and means co-operating with said cam disc for rendering said catch inoperative from time to time when the rotary key is opposite to a recess.

In testimony whereof I have signed my name to this specification.

FERDINAND JOHN.